May 17, 1960 F. C. WILLIAMS ET AL 2,937,288

SHIFT REGISTER CIRCUITS

Filed May 10, 1954

Inventors:
F. C. WILLIAMS
G. B. B. CHAPLIN

By Stevens, Davis, Miller & Mosher
Attorneys

United States Patent Office 2,937,288

Patented May 17, 1960

2,937,288

SHIFT REGISTER CIRCUITS

Frederic Calland Williams and George Brian Barrie Chaplin, Romiley, England, assignors to National Research Development Corporation, London, England, a corporation of Great Britain Application May 10, 1954, Serial No. 428,605

Claims priority, application Great Britain May 15, 1953

5 Claims. (Cl. 307—88.5)

This invention relates to electrical circuits employing transistors.

The specification of copending patent application Serial No. 367,842, filed July 14, 1953 by Frederic C. Williams et al., describes a mode of employing transistors in electrical circuits in which the transistor can be triggered from its non-conducting or "off" condition to a stable conducting or "on" condition such that the transistor bottoms.

The present invention relates to circuits for performing the functions of a "shift register," employing transistors in the above described regime.

A shift register in the present context is an electronic circuit comprising a series of stages each adapted to register (for example, by means of an output voltage or current which can occupy one value or another) a digit element of one kind or another, the circuit being adapted on actuation by a controlling signal to cause each stage of the series to impose upon the next succeeding stage the condition it itself registered prior to the controlling signal. Shift registers of this kind are referred to herein as "of the kind set forth." Such circuits are employed for example, in electronic digital computing apparatus operating on the binary system of notation in which digits are represented as either a "0" or a "1," the different positions of increasing significance representing the ascending powers of 2. Obviously such numbers can be represented by reference to the various states of a series of two-state circuits, one state of which represents "0" and the other state of which represents "1." It follows that if a series of such two-state circuits has been set up into the various conditions required to represent the "1's" and "0's" of a binary number, this number can, in effect, be multiplied by two simply by shifting all the digits by one place in the direction of greater significance. Alternatively, division by two corresponds to shifting of the digits by one place in the direction of less significance. Such a process is frequently required in computing apparatus for the purpose inter alia of multiplication.

In co-pending patent application Serial No. 367,842, above referred to various circuits are described which enable transistors to be used in two-state circuits and basically the present invention employs two-state transistor circuits of this kind as the individual stages of a shift register.

According to the present invention in one aspect, therefore, a shift register of the kind set forth is provided wherein each stage comprises a transistor and there are provided means for applying signals from the collector electrode of the transistor of one stage to a memory circuit and from said memory circuit to the emitter electrode of the transistor of the next stage, applying control signals to the base electrodes of the transistors of each stage to switch them off, and condition them to be switched on, and means for applying shift signals to the emitter electrodes of the transistors of each stage at a time when the transistors are conditioned to be switched on by said control signal to switch the transistors on or not, conditionally on the presence or absence of a controlling signal from said memory circuit.

According to the invention in another aspect a shift register of the kind set forth is provided wherein each stage comprises a transistor and there are provided means for feeding control signals to the base electrodes of the transistors operating to switch them off and to condition them to be switched on, means for feeding shift signals to the emitter electrodes of the transistors in the appropriate sense and at the appropriate times in relation to said control signals to switch them on, and a memory circuit connected to the collector electrode of one stage and to the emitter electrode of the next succeeding stage adapted to control, in accordance with the nature of the digit information previously registered by said one stage, whether or not the transistor of the succeeding stage is switched on by said shift signal.

According to another aspect of the invention a shift register of the kind set forth is provided wherein each stage comprises a transistor and there are provided means for feeding to the base electrodes of the transistors pulse signals operating to condition said transistors to be switched on for repetitive short intervals of time constituting shift intervals, means for feeding shift signals to the emitter electrodes of said transistors at the times when the transistors are conditioned to be switched on, said shift signals being in the appropriate sense to switch said transistors on, and means connected between the collector electrode of the transistor of one stage and the emitter electrode of the next succeeding stage adapted to provide a signal voltage for the emitter electrode of the transistor of the succeeding stage effective to procure switching on of said transistor conditionally on the transistor of the one stage having been switched on during the previous shift interval.

According to a still further aspect of the invention a shift register of the kind set forth is provided wherein each stage comprises a transistor and there are provided means for feeding to the base electrodes of the transistors pulse signals operating to switch said transistors off during a short interval of time, means for feeding to the emitter electrodes of said transistors shift signals immediately following said short intervals of time and means connected between the collector electrode of the transistor of a first stage and the emitter electrode of the transistor of the succeeding stage adapted to provide a signal for the emitter electrode of the succeeding stage to cause the transistor of said succeeding stage to be switched on by said shift signal conditionally on the transistor of said first stage having been switched on immediately prior to said shift interval.

In order that the invention may be more clearly understood, an embodiment thereof will now be described with reference to the accompanying drawings in which.

Figure 1:
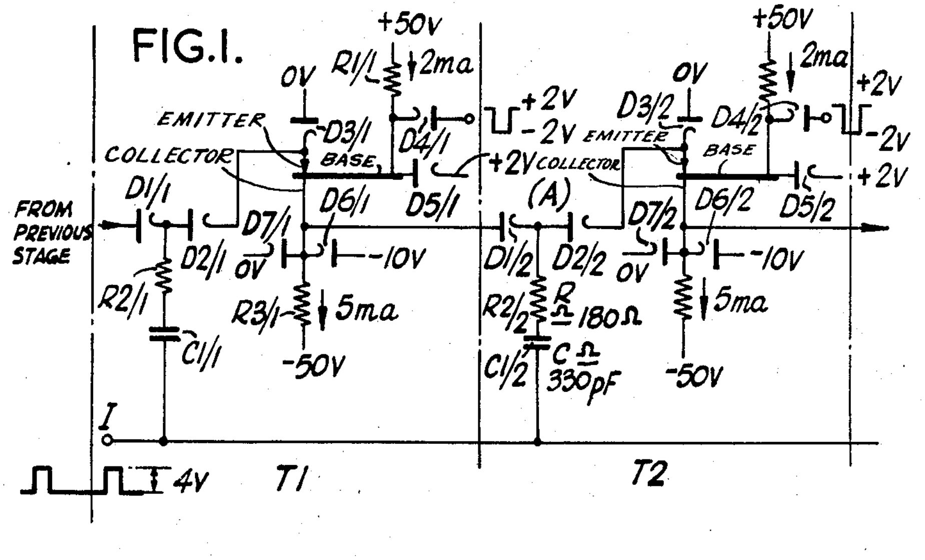
Figure 1 is a circuit diagram showing part of a shift register according to the invention.

Referring to Figure 1, this drawing shows two stages of a shift register according to the invention, which may consist of a considerable number of such stages of which the two shown may be anywhere in the series. Each of the two stages shown comprises a transistor $T_1$ and $T_2$ respectively, which has been drawn according to the invention described in co-pending patent application Serial No. 367,842 above referred to and is fed with "defined currents" in accordance with the technique of invention disclosed in that case. The potentials applied to the various electrodes of the transistors are also governed, according to the technique of the prior application above referred to, by diodes (which may of course be crystal diodes) and these diodes have been numbered with a first suffix which is related to the location of the diode in the circuit and a second suffix indicating the stage in which it occurs. Where in the ensuing description the second suffix is omitted, it can be assumed that the point under discussion is applicable to all stages generally. In the circuit of transistor $T_1$, the base electrode is connected to a 50 volt positive supply through resistor R1/1 which is chosen to provide a "defined current" of 2 milliamps to the base electrode. The voltage on the base electrode is restricted in the positive sense by diode D5/1 through which it is connected to a supply at +2 volts and negative-going so called "clock pulses" are applied to the base electrode through a diode D4/1. The emitter electrode is tied to 0 volts through a diode D3/1 and receives a signal from the previous stage through diodes D1/1 and D2/1. An input or shift signal is applied to the junction of the diodes D1/1 and D2/1 from an input terminal I through a condenser C1/1 and a resistor R2/1.

The collector electrode of $T_1$ is connected to —50 volts through a resistor R3/1, whereby a "defined current" of, say, 5 ma. is drawn from it, and its voltage excursion is limited between 0 volts and —10 volts by diodes D7/1 and D6/1 connected to earth and —10 volts respectively. In addition, the collector electrode is connected to the emitter electrode of the transistor $T_2$ of the next stage through diodes D1/2 and D2/2. The junction between the diodes D1/2 and D2/2 is also connected to the input terminal I through a resistor R2/2, R3/2 and condenser C1/2. This junction point has been labelled A and will be referred to as point A in the following description of the operation of the circuit. The connections to transistor $T_2$ are identical to those of $T_1$.

In the absence of a clock pulse on diode $D_4$ the base electrode of the transistor will be held at +2 volts by diode $D_5$. The emitter is at 0 volts, being held by diode $D_3$. The transistor is then "off" and a voltage of more than +2 v. on the emitter is required to switch it on.

The circuit according to this invention is primarily of interest in connection with electronic digital computers in which the various processes of the machine are controlled throughout by repetitive pulses, known as "clock" pulses. The present circuit has these pulses applied in negative-going sense to the base electrodes of all the transistors. They are, in the present example, pulses of about 4 volts amplitude between +2 volts and —2 volts and .5 $\mu$ sec. duration separated by interval of 1 $\mu$ sec. During the occurrence of these pulses the transistors are all conditioned to be switched on dependently on the voltages at their emitters.

As explained above, the object of a shift register of the kind to which this invention relates is to pass on from each stage to the next the condition previously assumed by the earlier stage and indicative of a given piece of information such as the presence of a "1" or a "0" in a binary number sequence. This shift is brought about in the present circuit by means of shift pulses applied through condenser $C_1$ and resistor $R_2$ to point A. These shift pulses are of about 4 volts amplitude and .25 $\mu$ sec. duration and are timed to coincide, leading edge to leading edge with the clock pulses.

Now the potential at point A is controlled by the potential at the collector electrode of transistor $T_1$, which will depend upon whether or not $T_1$ is switched on. On the occurrence of a shift pulse, therefore, either of two things can occur in the second stage (transistor $T_2$) as follows:

(1) If transistor $T_1$ was switched on by the previous shift pulse the condenser C1/2 will have been charged through D1/2 and point A will be near earth potential and will be carried positive by the shift pulse; transistor $T_2$ will thus be switched on, or (2) If transistor $T_1$ was not switched on by the previous pulse point A will be at —4 volts and will be carried only to earth potential by the shift pulse; transistor $T_2$ will not be switched on.

Figures 2, 3:
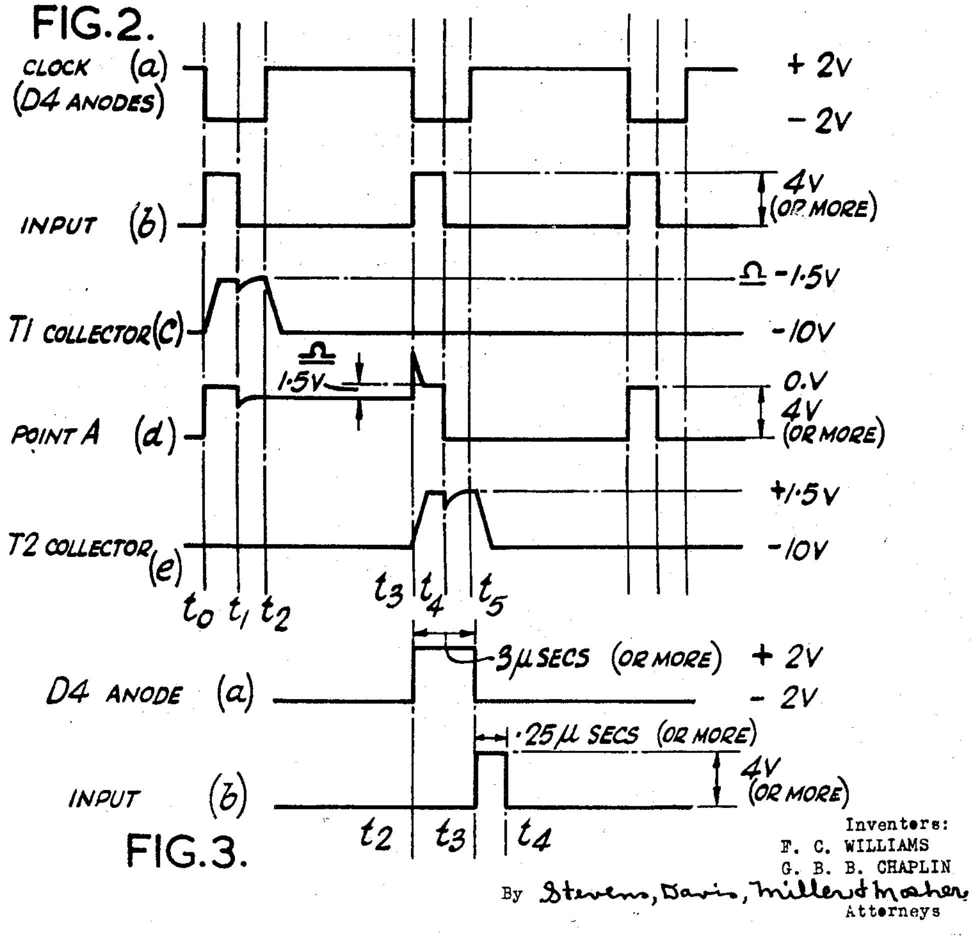
Figure 2 is a series of waveforms illustrating the operation of the circuit according to Figure 1.
Figure 3 is a waveform diagram illustrating an alternative mode of operation for the circuit of Figure 1.

The waveform diagram of Fig. 2 will serve to explain the operation of the circuit more fully. In these diagrams it is assumed that a "1" is indicated by a pulse from a transistor and a "0" by absence of such pulse, and that a "1" followed by a "0" is to be passed on from transistor $T_1$ to transistor $T_2$. Fig. 2(*a*) shows the clock pulse waveform and Fig. 2(*b*) the shift pulse waveform. Fig. 2(*c*) shows the waveform at the collector electrode of $T_1$ and Fig. 2(*d*) the waveform at point A, while Fig. 2(*e*) shows the waveform at the collector electrode of $T_2$.

At time $t_0$ the clock pulse and shift pulse are presumed to switch on $T_1$ by virtue of the potential existing at the junction of D1/1 and D2/1 due to the previous cycle. The collector electrode of $T_1$ thus rises from its resting potential of —10 volts towards earth thus charging condenser C1/2 through R2/2 and raising the potential of point A.

The collector current must rise to its full amplitude before the shift pulse ends at time $t_1$. The clock pulse switches off $T_1$ at time $t_2$.

Meanwhile, in transistor $T_2$ the clock pulse has prepared $T_2$ to be switched on, but point A having been at —4 volts (as will be apparent later) the shift pulse raises the emitter electrode of $T_2$ only to earth potential (or thereabouts) so that $T_2$ is not switched on.

Thus $T_1$ has registered a "1" and $T_2$ a "0," but point A has now been raised to about —1.5 volts.

On arrival of the next clock and shift pulses (time $t_3$) $T_2$ will be switched on as was $T_1$ in the previous cycle, since the shift pulse will tend to raise point A from —1.5 volts to 2.5 volts. However, diode D7/2 prevents the collector electrode of $T_2$ from rising above zero potential and hence the emitter above about +1.5 volts. Current thus flows from C1/2 into the emitter of $T_2$ through D2/2.

At time $t_4$, the end of the shift pulse, point A will be at about zero potential and will therefore be brought down, by cessation of the shift pulse to —4 volts. At time $t_5$ the end of the clock pulse switches off $T_2$. $T_2$ has thus delivered a .5$\mu$ sec. pulse indicating a "1."

Meanwhile, on occurrence of this second shift pulse, the junction between D1/1 and D2/1 was at —4 volts, a "0" having followed the "1" and transistor $T_1$ was not therefore switched on. Point A (and the junction of D1/1 and D2/1) will continue to be switched between —4 volts and zero by each shift pulse and the transistors will not be switched on until such time as a further "1" causes $T_1$ to be switched on as first described.

The time that can elapse between the transistors switching off and the arrival of the next input pulse will depend on the time taken for C to lose appreciable charge through the back resistance of diodes $D_1$ and $D_2$, thus for low pulse repetition frequencies the "on" states should be made correspondingly longer to prevent the "memory" contained in condenser C from being lost during the time all transistors are off.

The function of D7/2 is to allow rapid discharge of C when a "1" appears at $T_2$. It may be replaced, however, by a condenser and resistance in series from $T_2$ collector to earth of value similar to C and R. If this is done the clock waveform may be dispensed with and the "on" state made self terminating by replacing $D_4$ by a suitable inductance from base to +2 v. and reducing the collector current from 5 ma. to 3 ma.

The circuit may also be made to operate non-repetitively, i.e. with long, possibly variable, times between successive shifts. To do this it is necessary to maintain the transistors normally switched on to indicate a "1" (or off to indicate a "0"), during the times between shifts. The operation of the circuit is then as follows:

Referring to the waveforms of Fig. 3, Fig. 3(*a*) shows a clock pulse which is in this case positive-going and which will be gated so as to be applied to the transistor base electrodes only when a shift is to be effected. The corresponding shift pulse is shown at Fig. 3(*b*) and will be seen to occur immediately after the clock pulse.

The effect then is that, on arrival of a clock pulse all the transistors which were on are switched off for the duration of the clock pulse, at the end of which the base electrodes will all be restored to —2 volts to condition the transistors to be switched on again. On occurrence of the immediately following shift pulse those transistors will be switched on which experience a suitable voltage at the diode junction $D_1$, $D_2$ (Point A). These will, of course, be those in the stages following the transistors which were previously switched on, this fact being "remembered" by the corresponding condenser $C_1$ so that a shift of one place is achieved.

It will be apparent that the circuit according to the invention can be set up to register a given sequence of "1's" and "0's" by feeding in the appropriate digit signals serially at one end or alternatively by feeding in suitable signals in parallel to the diode junctions $D_1$, $D_2$.

We claim:

1. A shift register circuit comprising a plurality of stages each of which comprises a transistor, a memory circuit, and means for applying a first control signal having one of two possible values from the collector electrode of said transistor of one stage to said memory circuit, and from said memory circuit to the emitter electrode of the transistor of the next stage, means for limiting the upper value of said first control signal, means for applying second control signals to the base electrodes of the transistors of each stage to switch them off and condition them to be switched on, and means for applying simultaneously with the application of said second control signals to said base electrodes shift signals to said memory circuit to augment said first control signals to switch the transistors on or not, conditionally on the value of said first control signals.

2. A circuit according to claim 1 wherein said memory circuit comprises a condenser adapted to be charged under the control of said limiting means from the collector electrode circuit of said one stage when the transistor of that stage is switched on and wherein said shift signals are applied to the emitter of the succeeding stage through said condenser whereby the voltage to which said emitter is taken by said shift signals is dependent upon the state of charge of said condenser.

3. A circuit according to claim 2 wherein the collector electrode of said one stage is connected to a diode poled to conduct when the voltage on said collector electrode rises to a predetermined value due to switching on of the transistor of that stage, thereby to limit the charging of said condenser.

4. A circuit according to claim 3 wherein said condenser is connected through a resistor to said collector electrode through a diode poled in the appropriate sense to conduct when the voltage on said collector electrode rises due to switching on of the transistor, and to said emitter electrode through said resistor and a further diode poled to transfer positive-going signals from said condenser to said emitter.

5. A shift register circuit comprising a plurality of stages each of which comprises a transistor, a connection of the collector electrode of said transistor of a first stage through a diode to one side of a condenser and from the same side of said condenser through a further diode to the emitter electrode of the next following stage, a connection of said collector electrode through an impedance which is high compared with the internal impedance of said first transistor in its conducting state to a negative supply potential, diodes connecting said collector electrode to each of two bias potentials whereby the voltage excursions of said collector are limited between a fixed negative bias when said first stage transistor is non-conducting and an upper bias when said first stage transistor is conducting, a source of control signals connected to the base electrodes of all of said transistors adapted to switch said transistors off and condition them to be switched on, and a source of shift signals connected to the other side of said condenser and adapted to augment a signal stored on said condenser to raise the potential of the emitter electrode of said next following stage transistor at a time when said transistors are conditioned by one of said control signals to be switched on so as to switch said next following stage transistor on or not conditionally on the value of the signal stored on said condenser.

References Cited in the file of this patent

UNITED STATES PATENTS

| | | |
|---|---|---|
| 2,580,771 | Harper | Jan. 1, 1952 |
| 2,591,961 | Moore et al. | Apr. 8, 1952 |
| 2,760,087 | Felker | Aug. 21, 1956 |
| 2,847,159 | Curtis | Aug. 12, 1958 |